United States Patent
Saito et al.

(10) Patent No.: US 10,662,355 B2
(45) Date of Patent: May 26, 2020

(54) PRESSURE-SENSITIVE ADHESIVE COMPOSITION, PROCESS FOR PRODUCING SAME, AND PRESSURE-SENSITIVE ADHESIVE FILM

(71) Applicant: MITSUI CHEMICALS TOHCELLO, INC., Chiyoda-ku, Tokyo (JP)

(72) Inventors: Manami Saito, Nagoya (JP); Hiroyoshi Kurihara, Nagoya (JP)

(73) Assignee: MITSUI CHEMICALS TOHCELLO, INC., Chiyoda-Ku, Tokyo (JP)

( * ) Notice: Subject to any disclaimer, the term of this patent is extended or adjusted under 35 U.S.C. 154(b) by 33 days.

(21) Appl. No.: 15/752,638

(22) PCT Filed: Jul. 12, 2016

(86) PCT No.: PCT/JP2016/070599
§ 371 (c)(1),
(2) Date: Feb. 14, 2018

(87) PCT Pub. No.: WO2017/043173
PCT Pub. Date: Mar. 16, 2017

(65) Prior Publication Data
US 2018/0237672 A1    Aug. 23, 2018

(30) Foreign Application Priority Data
Sep. 10, 2015 (JP) .................. 2015-178909

(51) Int. Cl.
C09J 133/06 (2006.01)
C09J 175/14 (2006.01)
(Continued)

(52) U.S. Cl.
CPC .............. C09J 175/14 (2013.01); C09J 5/00 (2013.01); C09J 7/38 (2018.01); C09J 11/06 (2013.01);
(Continued)

(58) Field of Classification Search
None
See application file for complete search history.

(56) References Cited

U.S. PATENT DOCUMENTS

2008/0099141 A1* 5/2008 Booth .................. C08G 18/289
156/331.7
2008/0312403 A1* 12/2008 Stockel ................. C08F 299/00
528/59
(Continued)

FOREIGN PATENT DOCUMENTS

JP    2002-241732 A    8/2002
JP    2005-264093 A    9/2005
(Continued)

OTHER PUBLICATIONS

International Search Report (PCT/ISA/210) dated Oct. 18, 2016, by the Japanese Patent Office as the International Searching Authority for International Application No. PCT/JP2016/070599.
(Continued)

*Primary Examiner* — Ramsey Zacharia
(74) *Attorney, Agent, or Firm* — Buchanan Ingersoll & Rooney PC

(57) ABSTRACT

The present invention is an adhesive composition that is characterized by including (A) a polymer comprising a structural unit having a hydroxy group in a side chain, (B) a compound having two or more isocyanate groups, (C) a bismuth carboxylate, and (D) a tertiary amine having a pKa of 6 or more. The polymer (A) may include further a structural unit having a urethane bond and a polymerizable unsaturated bond in a side chain.

8 Claims, 1 Drawing Sheet

(51) Int. Cl.
*C09J 7/38* (2018.01)
*C09J 11/06* (2006.01)
*C09J 201/06* (2006.01)
*C09J 175/04* (2006.01)
*C09J 5/00* (2006.01)
C08K 5/098 (2006.01)
C08K 5/17 (2006.01)

(52) U.S. Cl.
CPC ......... *C09J 133/06* (2013.01); *C09J 133/066* (2013.01); *C09J 175/04* (2013.01); *C09J 201/06* (2013.01); C08K 5/098 (2013.01); C08K 5/17 (2013.01); C09J 2201/122 (2013.01); C09J 2203/326 (2013.01); C09J 2205/302 (2013.01); C09J 2475/00 (2013.01)

(56) References Cited

U.S. PATENT DOCUMENTS

| | | |
|---|---|---|
| 2010/0233409 A1 | 9/2010 | Kamiya et al. |
| 2012/0121686 A1 | 5/2012 | Beckman et al. |
| 2015/0322289 A1* | 11/2015 | Schaefer ............ C08G 18/6225 427/379 |
| 2016/0215172 A1* | 7/2016 | Morita ....................... C09J 9/02 |

FOREIGN PATENT DOCUMENTS

| | | |
|---|---|---|
| JP | 2006-199730 A | 8/2006 |
| JP | 2010-007049 A | 1/2010 |
| JP | 2010-195862 A | 9/2010 |
| JP | 2013-157420 A | 8/2013 |
| JP | 2014-063951 A | 4/2014 |

OTHER PUBLICATIONS

Written Opinion (PCT/ISA/237) dated Oct. 18, 2016, by the Japanese Patent Office as the International Searching Authority for International Application No. PCT/JP2016/070599.

Anonymous: "Technical Bulletin—Amine Applications and Properties Data," Jan. 1, 2008, XP055571275 (7 pages).

Extended Search Report issued by the European Patent Office in corresponding European Patent Application No. 16844038.6-1102 dated Mar. 28, 2019 (7 pages).

Office Action dated Dec. 25, 2019, by the State Intellectual Property Office of the People's Republic of China in corresponding Chinese Patent Application No. 201680051361.6 and a machine English translation of the Office Action. (40 pages).

Notification of Reason for Refusal issued by the Korean Intellectual Property Office in corresponding Korean Patent Application No. 10-2018-7009685 dated Aug. 19, 2019 (9 pages including partial English translation).

* cited by examiner

PRESSURE-SENSITIVE ADHESIVE COMPOSITION, PROCESS FOR PRODUCING SAME, AND PRESSURE-SENSITIVE ADHESIVE FILM

TECHNICAL FIELD

The present invention relates to an adhesive composition which is capable of forming an adhesive layer having adequate tackiness to an adherend, and providing an adhesive film that suppresses adhesive residues on a surface of the adherend when the adhesive layer is cured by irradiating the adhesive layer pasted on the adherend with radiation, or by heating the adhesive layer, to lower tackiness to the adherend, and the adhesive layer is peeled off from the adherend. And the present invention relates to a process for producing the same.

BACKGROUND ART

Conventionally, adhesive films such as an adhesive tape, an adhesive sheet, and an adhesive label have been widely used in production of products including daily necessities. Typical examples of the constitution of the adhesive film include an adhesive film including a resin film layer and an adhesive layer containing a polymer having a urethane bond. When a polymer having a urethane bond is obtained, a compound having a hydroxy group is usually reacted with a compound having an isocyanate group, and at this time, an organotin compound such as dibutyltin dilaurate is used as a catalyst (see, for example, Patent Document 1). However, the organotin compound is said to have effects on the human body and the environment, and its use is restricted by the REACH regulation. As the other catalyst, a complex such as zirconium tetraacetylacetonate, tetra-n-butoxy zirconium, titanium tetraacetylacetonate, titanium tetra-2-ethylhexoside, dibutoxy titanium bisacetylacetonate, and aluminum monoacetylacetonate bis(ethyl acetoacetate) is used (see, for example, Patent Document 2).

Incidentally, the adhesive film is also used in applications that dislike contamination caused by impurities and the like, for example, in production processes for semiconductor parts, electronic parts, or the like. Specific examples thereof include a surface protection adhesive film for protecting a surface of a semiconductor wafer when a back face of the semiconductor wafer on which an integrated circuit and the like is formed is subjected to grinding processing.

PRIOR TECHNICAL DOCUMENT

Patent Document

[Patent Document 1] JP-A 2002-241732
[Patent Document 2] JP-A 2014-63951

SUMMARY OF THE INVENTION

Problems that the Invention is to Solve

An object of the present invention is to provide an adhesive composition that includes a polymer containing a structural unit having a hydroxy group in a side chain, a compound having two or more isocyanate groups, and a catalyst for a urethane bond forming reaction for reacting them, and that is capable of forming an adhesive layer having appropriate cohesiveness and tackiness when other catalyst except an organotin compound is used, a process for producing the same, and an adhesive film. Another object of the present invention is to provide an adhesive composition that further includes a polymerization initiator, that is capable of forming an adhesive layer having appropriate cohesiveness and tackiness, that is capable of peeling off the adhesive layer from an adherend by irradiating the adhesive layer adhering to the adherend with radiation or heating the adhesive layer to decrease adhesive strength, and that is suppressing an occurrence of adhesive residues on a surface of the adherend after peeling, a process for producing the same, and an adhesive film.

Means for Solving the Problems

The present inventors have found that an adhesive layer having appropriate cohesiveness and tackiness is formed when an adhesive composition including a bismuth carboxylate in place of an organotin compound conventionally used as a catalyst for a urethane bond forming reaction, a polymer containing a structural unit having a hydroxy group in a side chain, a compound having two or more isocyanate groups, and a tertiary amine having a pKa of 6 or more is used. Also, the present inventors have found that a combination of the above polymer, a compound having two or more isocyanate groups, a bismuth carboxylate, a tertiary amine having a pKa of 6 or more, and a polymerization initiator is suitable when considering the peelability of an adhesive layer obtained using an adhesive film and the adhesive composition prepared by obtaining a polymer that contains a structural unit having a urethane bond and a polymerizable unsaturated bond in a side chain and a structural unit having a hydroxy group in a side chain in the presence of a bismuth carboxylate, and thereafter recycling the bismuth carboxylate remaining in a composition containing the polymer (reaction mixture).

Hereinafter, the definitions of terms herein will be briefly described.

"Polymerizable unsaturated bond" means an ethylenically unsaturated bond having radical polymerizability.

"Structural unit having a hydroxy group in a side chain" is a structural unit that has a side chain branched from a main chain, and that the hydroxy group contained in the side chain is bonded to a carbon atom constituting the main chain directly or via another atom or an atomic group.

"Structural unit having a urethane bond in a side chain" is a structural unit that has a side chain branched from a main chain, and that the urethane bond contained in the side chain is bonded to a carbon atom constituting the main chain directly or via another atom or an atomic group.

"(Meth)acryl" means acryl and methacryl; "(meth)acrylate" means acrylate and methacrylate; and "(meth)acryloyl" means acryloyl and methacryloyl.

"Radiation" is a generic term for ionizing radiation including light such as ultraviolet light; laser; or an electron beam.

"Adhesive film" does not particularly need to be distinguished by size such as width and thickness, but includes an adhesive tape, an adhesive sheet, an adhesive label, and the like.

The adhesive composition of the present invention is characterized by including (A) a polymer containing a structural unit having a hydroxy group in a side chain, (B) a compound having two or more isocyanate groups, (C) a bismuth carboxylate, and (D) a tertiary amine having a pKa of 6 or more.

The polymer (A) is preferably further contains a structural unit having a urethane bond and a polymerizable unsaturated bond in a side chain.

The bismuth carboxylate (C) is preferably represented by $Bi(OOCR^{20})_3$ (in the formula, each of three $R^{20}$s is independently a hydrocarbon group having 1 to 17 carbon atoms).

The adhesive composition may further include a polymerization initiator.

The production method of an adhesive composition in the present invention is characterized by mixing a polymer containing a structural unit having a hydroxy group in a side chain, a compound having two or more isocyanate groups, a bismuth carboxylate, and a tertiary amine having a pKa of 6 or more.

In the present invention, the polymer containing a structural unit having a hydroxy group in a side chain preferably further contains a structural unit having a urethane bond and a polymerizable unsaturated bond in a side chain. In this case, the production method may include sequentially a first process in which a composition including a polymer (P2) and the bismuth carboxylate, the polymer (P2) obtained by reacting a polymer (P1) containing a structural unit (p1) having a hydroxy group in a side chain with a monomer (M) having an isocyanate group in the presence of the bismuth carboxylate to modify a part of the structural unit (p1) to the structural unit (p2) while leaving another part of the structural unit (p1), and containing the structural unit (p1) and the structural unit (p2), and a second process in which the composition, a compound having two or more isocyanate groups, and a tertiary amine having a pKa of 6 or more are mixed.

The adhesive film of the present invention is characterized by including a substrate and an adhesive layer that is disposed on a surface of the substrate and that contains the adhesive composition of the present invention.

Effects of the Invention

According to one embodiment of the adhesive composition of the present invention, an adhesive layer having appropriate cohesiveness and tackiness can be obtained. According to another embodiment of the adhesive composition of the present invention, an adhesive layer having appropriate cohesiveness and tackiness can be obtained, the adhesive layer can be peeled off from an adherend by irradiating the adhesive layer adhering to the adherend with radiation or heating the adhesive layer to lower the tackiness, and adhesive residues on the surface of the adherend can be suppressed after peeling. This effect is remarkable when an adhesive film having the adhesive layer is used for a work process such as grinding of a circuit back face of a semiconductor wafer or dicing of the semiconductor wafer.

According to the process for producing the adhesive composition of the present invention, the adhesive composition having the above performance can be efficiently produced.

An adhesive film having an adhesive layer that includes (A) a polymer containing a structural unit having a hydroxy group in a side chain and a structural unit having a urethane bond and a polymerizable unsaturated bond in a side chain, (B) a compound having two or more isocyanate groups, (C) a bismuth carboxylate, (D) a tertiary amine having a pKa of 6 or more, and a polymerization initiator is suitable in a semiconductor production process including grinding processing of a semiconductor wafer. For example, an adhesive film is pasted on a surface of a semiconductor wafer on which an integrated circuit is formed to protect the integrated circuit, and the back face of the semiconductor wafer is then subjected to grinding processing to suppress the penetration of liquid, grinding scraps, and the like into the surface of the semiconductor wafer, contaminations, and the like. After the completion of the grinding processing, as described above, the adhesive layer is cured by irradiation with radiation or heating, to allow the tackiness to be lowered, to allow the breakage of the semiconductor wafer and the adhesive residues on the surface on which the adhesive film is pasted to be suppressed, and to allow the adhesive film to be easily peeled off.

EMBODIMENTS FOR CARRYING OUT THE INVENTION

1. Adhesive Composition

Figure 1:
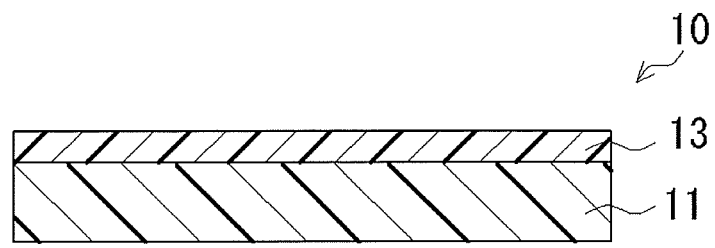
FIG. 1 is a schematic cross-sectional view showing an example of an adhesive film according to a first embodiment of the present invention.

An adhesive composition of the present invention contains (A) a polymer comprising a structural unit having a hydroxy group in a side chain, (B) a compound having two or more isocyanate groups (hereinafter, also referred to as "polyisocyanate (B)"), (C) a bismuth carboxylate, and (D) a tertiary amine having a pKa of 6 or more (hereinafter, also referred to as "tertiary amine (D)").

The polymer (A) is a polymer containing a structural unit having a hydroxy group in a side chain (hereinafter referred to as "structural unit (a1)"), and may be either a homopolymer or a copolymer. The polymer (A) may also be a copolymer containing other structural unit (hereinafter referred to as "structural unit (a2)").

A content of the hydroxy group in the polymer (A) is preferably in a range from 0.01 to 5 mmol, more preferably from 0.01 to 3 mmol, and further preferably from 0.02 to 1.6 mmol based on 1 g of the polymer (A) from viewpoints of the reactivity between the polymer (A) and the polyisocyanate (B) and the adhesiveness to an adherend.

A content ratio of the structural unit (a1) in the polymer (A) is preferably in a range from 1% to 40% by mass, more preferably from 1% to 20% by mass, and further preferably from 1% to 10% by mass based on 100% by mass of a total of all structural units constituting the polymer (A).

The structural unit (a1) is a structural unit having a hydroxy group in a side chain, and is a structural unit derived from a hydroxy group containing monomer (described later). A number of the side chains in one structural unit may be 1, 2, or more. When the structural unit has a plurality of side chains, at least one of the side chains may contain a hydroxy group.

A number of the hydroxy groups in the structural unit (a1) is not particularly limited.

Examples of the structural unit (a1) include a structural unit represented by the general formula (1) (hereinafter, referred to as "structural unit (a1-1)") and a structural unit represented by the general formula (2) (hereinafter, referred to as "structural unit (a1-2)".

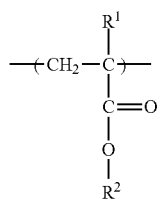

(In the formula, $R^1$ is a hydrogen atom or a methyl group, and $R^2$ is an organic group containing a hydroxy group.)

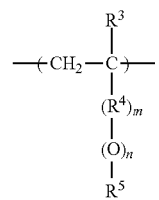

(In the formula, $R^3$ is a hydrogen atom or a methyl group; $R^4$ is a divalent hydrocarbon group having 1 to 24 carbon atoms; $R^5$ is a hydroxy group containing hydrocarbon group having 1 to 24 carbon atoms in which at least one hydrogen atom is substituted with a hydroxy group, or a hydrogen atom; and m and n are independently 0 or 1. When m is 0, n is 0 or 1, and $R^5$ is a hydroxy group containing hydrocarbon group having 1 to 24 carbon atoms in which at least one hydrogen atom is substituted with a hydroxy group. When m is 1, n is 0 or 1, and $R^5$ is a hydroxy group containing hydrocarbon group having 1 to 24 carbon atoms in which at least one hydrogen atom is substituted with a hydroxy group, or a hydrogen atom.)

In the general formula (1), $R^2$ is preferably a hydroxy group containing hydrocarbon group having 1 to 24 carbon atoms in which at least one hydrogen atom is substituted with a hydroxy group, and more preferably a hydroxy group containing hydrocarbon group having 1 to 8 carbon atoms, and having a hydroxy group at least at a terminal.

The structural unit (a1-1) represented by the above general formula (1) can be formed from 2-hydroxyethyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, (4-hydroxymethylcyclohexyl) methyl (meth)acrylate, and the like.

In the general formula (2) representing the structural unit (a1-2), $R^4$ can be a linear or branched hydrocarbon group. The structural unit (a1-2) represented by the general formula (2) is particularly preferably a structural unit in which $R^4$ is an aliphatic hydrocarbon group. Such structural units can be formed from allyl alcohol, allyl glycol, vinylbenzyl alcohol, hydroxy-α-methylstyrene, hydroxymethyl-α-methylstyrene, and the like.

Examples of the structural unit (a1) other than the structural units (a1-1) and (a1-2) include a structural unit having a side chain branched from a main chain in which a side chain having a hydroxy group further has both a urethane bond and a polymerizable unsaturated bond; a structural unit having a side chain branched from a main chain in which a side chain having a hydroxy group further has a carbonyl group or an ether bond; a structural unit having a side chain branched from a main chain and further containing an atom other than a carbon atom and a hydrogen atom; a structural unit having a side chain branched from a main chain and having a polyalkylene glycol skeleton; and the like. In these other structural units, the hydroxy group in the side chain may be at a terminal of the side chain or not.

The structural unit (a2) may be a structural unit having a functional group other than a hydroxy group. The structural unit (a2) may be a structural unit containing at least one selected from a polymerizable unsaturated bond, an ester bond, an epoxy bond, a urethane bond, an ether bond, a hydrocarbon group, an amino group, an amide group, an oxazoline group, a carboxy group, a sulfonic acid group, a phosphoric acid group, and an epoxy group.

In the present invention, the structural unit (a2) is preferably a structural unit having a urethane bond and a polymerizable unsaturated bond in a side chain (hereinafter referred to as "structural unit (a2-1)"). When an adhesive layer is formed using a composition in which the polymer (A) having the structural unit (a2-1) is used in combination with a polymerization initiator described later, the adhesive layer can be cured by applying a stimulus by heat or radiation.

The structural unit (a2-1) is a structural unit in which both a urethane bond and a polymerizable unsaturated bond are contained in one side chain (same side chain). A number of the side chains containing both a urethane bond and a polymerizable unsaturated bond is not particularly limited. This side chain may contain other functional groups or other bonds. The structural unit (a2-1) may contain a side chain not containing both a urethane bond and a polymerizable unsaturated bond.

A content of the polymerizable unsaturated bond in the structural unit (a2-1) is preferably in a range from 0.05 to 1.2 mmol, more preferably from 0.1 to 1.0 mmol, and further preferably from 0.2 to 0.7 mmol based on 1 g of the polymer (A) from a viewpoint of the releasability of the adhesive layer adhering to the adherend.

In the structural unit (a2-1), the structure of the side chain containing both a urethane bond and a polymerizable unsaturated bond is formed in the order of the urethane bond and the polymerizable unsaturated bond when viewed from a main chain. As described above, the side chain may contain other functional groups and the like.

A specific example of the structural unit (a2-1) is represented by the following general formula (3).

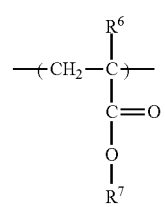

(In the formula, $R^6$ is a hydrogen atom or a methyl group, and $R^7$ is an organic group containing a urethane bond and a polymerizable unsaturated bond.)

The structural unit (a2-1) is particularly preferably a structural unit in which $R^6$ in the general formula (3) is a hydrogen atom or a methyl group, and $R^7$ is an organic group containing a urethane bond and a polymerizable unsaturated bond in order when viewed from a main chain, and having a polymerizable unsaturated bond at a terminal, that is, a structural unit represented by the following general formula (4).

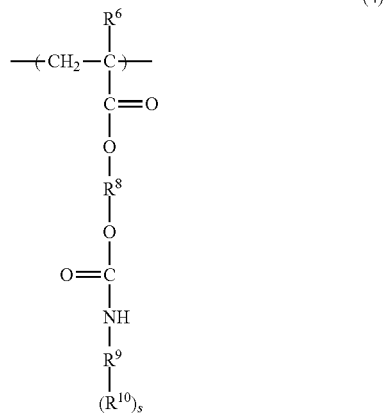

(In the formula, $R^6$ is a hydrogen atom or a methyl group; $R^8$ is a divalent organic group, and is a hydrocarbon group having 1 to 24 carbon atoms in which a hydrogen atom may be substituted with other atom or a functional group; $R^9$ is a divalent or trivalent hydrocarbon group having 1 to 24 carbon atoms or a derivative group thereof; and $R^{10}$ is represented by the following formula:

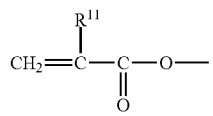

($R^{11}$ is a hydrogen atom or a methyl group); and s is 1 or 2.)

The structural unit represented by the general formula (4) can be derived from, for example, a compound obtained by reacting a hydroxy group in a polymer containing a structural unit derived from a hydroxy group containing (meth) acrylate such as 2-hydroxyethyl (meth)acrylate with an isocyanate group in a compound having an isocyanate group and a polymerizable unsaturated bond (described later).

Other examples for the structural unit (a2-1) include a structural unit containing a carbonyl group or an ether bond in a side chain containing both a urethane bond and a polymerizable unsaturated bond, a structural unit containing an atom other than a carbon atom and a hydrogen atom in a side chain containing both a urethane bond and a polymerizable unsaturated bond, a structural unit having a polyalkylene glycol skeleton in a side chain containing both a urethane bond and a polymerizable unsaturated bond, and the like.

A content ratio of the structural unit (a2-1) is preferably in a range from 1% to 30% by mass, and more preferably from 3% to 20% by mass based on the whole of the polymer (A).

Other examples for the structural unit (a2) include a structural unit having only a urethane bond in a side chain; a structural unit having only a polymerizable unsaturated bond in a side chain; a structural unit containing at least one functional group selected from an ester bond, an ether bond, a monovalent hydrocarbon group, a cyano group, an amino group, an amide group, an oxazoline group, a carboxy group, a sulfonic acid group, a phosphoric acid group, and an epoxy group; and the like. These structural units may be derived from a monomer having a urethane bond, a monomer having two or more polymerizable unsaturated bonds, a monomer having an ester bond (excluding a monomer imparting the structural units (a1-1) and (a1-2)), a monomer having an ether bond, a monomer having a monovalent hydrocarbon group (excluding a monomer in which $R^1$ is a hydrocarbon group in the general formula (1) representing the structural unit (a1-1), and a monomer in which $R^3$ is a hydrocarbon group in the general formula (2) representing the structural unit (a1-2)), a monomer having a cyano group, a monomer having an amino group, a monomer having an amide group, a monomer having an oxazoline group, a monomer having a carboxy group, a monomer having a sulfonic acid group, a monomer having a phosphoric acid group, a monomer having an epoxy group, and the like.

In the present invention, the polymer (A) is preferably a polymer containing a structural unit derived from alkyl ester (meth)acrylate such as methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, cyclohexyl (meth)acrylate, phenyl (meth)acrylate, and benzyl(meth)acrylate, that is, a structural unit containing an ester bond and a monovalent hydrocarbon group together with the structural unit (a2-1).

A weight average molecular weight of the polymer (A) as determined by gel permeation chromatography is preferably in a range from 50,000 to 1,000,000, more preferably from 100,000 to 700,000, and further preferably from 150,000 to 500,000 from viewpoints of tackiness and a cohesion force.

The polyisocyanate (B) is a compound having two or more isocyanate groups, and any of an aliphatic polyisocyanate, an alicyclic polyisocyanate, an aromatic polyisocyanate, a heterocyclic polyisocyanate and a modified product thereof such as an adduct-modified product, an isocyanurate-modified product, and a biuret-modified product may be used. Two or more of these may be combined.

Examples of the aliphatic polyisocyanate include 1,2-ethylene diisocyanate; a tetramethylene diisocyanate such as 1,2-tetramethylene diisocyanate, 1,3-tetramethylene diisocyanate and 1,4-tetramethylene diisocyanate; a hexamethylene diisocyanate such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; 2-methyl-1,5-pentanediylbis isocyanate, 3-methyl-1,5-pentanediylbis isocyanate, lysine diisocyanate, and the like.

Examples of the alicyclic polyisocyanate include isophorone diisocyanate; a cyclohexyl diisocyanate such as 1,2-cyclohexyl diisocyanate, 1,3-cyclohexyl diisocyanate, 1,4-cyclohexyl diisocyanate, bis(4-isocyanatocyclohexyl) methane, 1,3-bis(isocyanatomethyl)cyclohexane, and 1,4-bis(isocyanatomethyl)cyclohexane; a cyclopentyl diisocyanate such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate, 4,4'-dicyclohexylmethane diisocyanate, and the like.

Examples of the aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, xylylene-1,3-diisocyanate, diphenylsulfide-4,4-diisocyanate, and the like.

Examples of the heterocyclic polyisocyanate include 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and the like.

In a case where the adduct-modified product is used as the polyisocyanate (B), a reaction product formed from an aliphatic polyisocyanate, an alicyclic polyisocyanate or an aromatic polyisocyanate, and a polyhydric alcohol such as 1,2,5-hexanetriol, 1,2,6-hexanetriol, 1,2,3-propanetriol, 1,2,3-benzenetriol, 1,2,4-benzenetriol, trimethylolethane, and trimethylolpropane is preferably used.

In a case where the isocyanurate-modified product is used as the polyisocyanate (B), a reaction product formed from an aliphatic polyisocyanate, an alicyclic polyisocyanate or an aromatic polyisocyanate and water is preferably used.

In a case where the biuret-modified product is used as the polyisocyanate (B), a reaction product formed from diisocyanate and urea is preferably used.

A content ratio of the polyisocyanate (B) in the adhesive composition of the present invention is appropriately selected depending on an amount of the hydroxy group in the polymer (A). The polyisocyanate (B) may be contained so that all of the hydroxy groups in the polymer (A) are consumed by the contained isocyanate group, or may be contained so that a part of the hydroxy groups remain. The content ratio of the polyisocyanate (B) is preferably in a range from 0.001 to 10 parts by mass, more preferably from 0.01 to 5 parts by mass, and further preferably from 0.1 to 3 parts by mass based on 100 parts by mass of the content of the polymer (A) from viewpoints of tackiness and cohesiveness.

The adhesive composition of the present invention further contains a bismuth carboxylate (C) and a tertiary amine (D). Each component is a catalyst that leads to a reaction of a hydroxy group in the polymer (A) with an isocyanate group in the polyisocyanate (B), causes a formation of a urethane bond to proceed, imparts an adequate crosslinking point to an adhesive layer formed from the adhesive composition, and imparts cohesiveness and tackiness.

The bismuth carboxylate (C) is usually represented by $Bi(OOCR^{20})_3$ (in the formula, $R^{20}$ is a hydrocarbon group). The bismuth carboxylate (C) is preferably a $Bi(OOCR^{20})_3$ (in the formula, each of three $R^{20}$s is independently a hydrocarbon group having 1 to 17 carbon atoms) since it causes the reaction to smoothly proceed to provide suitable cohesiveness and tackiness with respect to an adherend.

A content ratio of the bismuth carboxylate (C) in the adhesive composition of the present invention is preferably in a range from 0.001 to 5 parts by mass, more preferably from 0.001 to 1 part by mass, and further preferably from 0.001 to 0.5 part by mass based on 100 parts by mass of the content of the polymer (A) since a urethanization reaction is accelerated.

The tertiary amine (D) is a tertiary amine having a pKa of 6 or more, preferably 8 or more (the upper limit is normally 14). Such a tertiary amine (D) is considered to have high nucleophilicity, effectively act on a reaction site, and exhibit high catalytic activity with respect to a urethane bond forming reaction. In the present invention, an aliphatic, alicyclic or aromatic amine compound, an imine compound, an amide compound, a heterocyclic compound such as a N-substituted imidazole, and a N-substituted morpholine, and the like can be used.

Examples of the tertiary amine (D) include N,N-dimethylethylamine, N,N-diethylmethylamine, N,N-dimethylisopropylamine, N,N,N',N'-tetramethylethylenediamine, N,N,N',N'-tetramethylpropane-1,3-diamine, N,N,N',N'-tetramethylhexamethylenediamine, 1,1,4,7,7-pentamethyldiethylenetriamine, 1,1,4,7,7-pentaethyldiethylenetriamine, 1,1,4,7,7-pentamethyldipropylenetriamine, 2,5,8,11-tetramethyl-2,5,8,11-tetraazadodecane, N,N,N'-trimethyl-N'-[3-(dimethylamino)propyl]-1,2-ethanediamine, N,N,N',N'-tetramethyl-4-methyl-4-azaheptane-1,7-diamine, 1,1,3,3-tetramethylguanidine, 1,3,5-tris[3-(dimethylamino)propyl]hexahydro-s-triazine, 1,8-diazabicyclo[5.4.0]undeca-7-ene, triethylenediamine, 2-methyltriethylenediamine, 2,5-dimethyltriethylenediamine, 1-methyl-4-[2-(dimethylamino)ethyl]piperazine, 1,4-dimethylpiperazine, N-methyldicyclohexylamine, N-methylmorpholine, N-ethylmorpholine, 4,4'-(oxydimethylene)dimorpholine, 4,4'-(oxydiethylene)dimorpholine, bis[2-(dimethylamino)ethyl]ether, bis[2-(diethylamino)ethyl]ether, bis[2-(diethylamino)propyl]ether, imidazole, 1-methylimidazole, 1,2-dimethylimidazole, 1-isobutyl-2-methyl-1H-imidazole, 1-dimethylaminopropylimidazole, triethylamine, tri-n-propylamine, dimethylisopropylamine, ethyldiisopropylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, N,N-dimethyloctadecylamine, methylisopropylbenzylamine, methylcyclopentylbenzylamine, isopropyl-sec-butyl-trifluoroethylamine, diethyl-(α-phenylethyl)amine, 1-amino-3-(dimethylamino)propane, N-(3-aminopropyl)-N,N',N'-trimethyl-[2,2'-oxybis(ethanamine)], N,N,N',N',N'',N''-hexamethyl-(4-aminomethyl)octane-1,8-diamine, bis(N,N'-dimethylaminoethylpiperazinyl)ethane, N,N',N'-trimethyl-N'-(2-methoxyethyl)ethylenediamine, and the like. These amine compounds may be used singly or in combination of two or more types thereof. In the present invention, a tertiary amine having a heterocyclic structure containing a nitrogen atom is preferable. It is considered that such a tertiary amine is likely to come close to a reaction site because of small steric hindrance around the unshared electron pair of the nitrogen atom, which provides a high catalytic effect. Examples of such a tertiary amine include triethylenediamine, hexamethylenetetramine, and the like. In the present invention, a tertiary amine in which the heterocyclic structure is an aromatic ring structure is more preferable, and examples of such a tertiary amine include an imidazole, a pyrrole, a pyridine, and the like.

A molecular weight of the tertiary amine (D) is preferably in a range from 80 to 1,000 and more preferably from 90 to 500 from a viewpoint of causing the urethanization reaction to smoothly proceed without volatilizing the tertiary amine in the production process of the adhesive composition or the production of the adhesive film and the like using the adhesive composition.

In the present invention, among the tertiary amine having a molecular weight within the above range, a compound having a boiling point of 150° C. or higher at 1 atm or a compound having a decomposition point without having a boiling point is particularly preferable since the volatilization of the tertiary amine is suppressed in the production process of the adhesive composition, and the production of the adhesive film or the like using the adhesive composition.

Preferable examples of the amine compound having a high boiling point (150° C. or higher) includes tributylamine, trihexylamine, trioctylamine, dimethyloctylamine, dimethyllaurylamine, 1-benzyl-2-methylimidazole, 1,2-dimethylimidazole, bifonazole, triethylenediamine, dimethylbenzylamine, quinoline, 4-benzylpyridine, quinuclidine, N,N-bis(3-aminopropyl)dodecylamine, and the like.

A content ratio of the tertiary amine (D) in the adhesive composition of the present invention is preferably in a range from 0.001 to 5 parts by mass, more preferably from 0.005 to 2 parts by mass, and further preferably from 0.01 to 0.5 part by mass based on 100 parts by mass of the content of the polymer (A) since the urethanization reaction is accelerated.

The adhesive composition of the present invention may contain a tertiary amine other than the tertiary amine (D).

The adhesive composition of the present invention may contain other components. The adhesive composition may further contain a polymerization initiator, a compound having a polymerizable unsaturated bond other than the polymer (A) (hereinafter referred to as "other monomer"), additives, an organic solvent, and the like.

In a case where an adhesive composition containing a polymerization initiator is used to form an adhesive layer, when a radiation is irradiated to an adhesive layer in a product integrated with an adherend, or when the adhesive layer is heated, the reaction product is cured and a tackiness is lowered with respect to the adherend, and the adhesive layer is easily peeled off.

As the polymerization initiator, a photopolymerization initiator or a thermal polymerization initiator is preferably used.

The photopolymerization initiator is particularly limited as long as it is excited with energy of ultraviolet light, visible light, or near-infrared light to generate radicals, thereby to accelerate the radical polymerization of the reaction product. Examples of the photopolymerization initiator include a benzoin such as benzoin, benzoin methyl ether, benzoin propyl ether and benzoin isobutyl ether; an acetophenone such as acetophenone, 2,2-dimethoxy-2-phenylacetophenone, 2,2-diethoxy-2-phenylacetophenone, 1,1-dichloroacetophenone, 2-hydroxy-2-methyl-1-phenyl-propane-1-one, 1-hydroxycyclohexyl phenyl ketone, 2-methyl-1-[4-(methylthio)phenyl]-2-morpholino-propane-1-one, and N,N-dimethylaminoacetophenone; an anthraquinone such as 2-methylanthraquinone, 1-chloroanthraquinone and 2-amylanthraquinone; a thioxanthone such as 2,4-dimethylthioxanthone, 2,4-diethylthioxanthone, 2-chlorothioxanthone and 2,4-diisopropylthioxanthone; a ketal such as acetophenone dimethyl ketal and benzil methyl ketal; a benzophenone such as benzophenone, methylbenzophenone, 4,4'-dichlorobenzophenone, 4,4'-bisdiethylaminobenzophenone, Michler's ketone and 4-benzoyl-4'-methyldiphenylsulfide; 2,4,6-trimethylbenzoyldiphenylphosphine oxide, bis(2,6-dimethoxybenzoyl)-2,4,4'-trimethylpentylphosphine oxide, camphorquinone, and the like. The photopolymerization initiator may be used singly or in combination of two or more types thereof.

The thermal polymerization initiator is not particularly limited as long as it generates radicals upon heating, thereby to accelerate the radical polymerization of the reaction product. Examples of the thermal polymerization initiator include an organic peroxide and an azo compound. The thermal initiator may be used singly or in combination of two or more types thereof.

Examples of the organic peroxide include a diacyl peroxide such as lauroyl peroxide and benzoyl peroxide; an alkyl peroxy ester such as tert-butylperoxy-3,5,5-trimethyl hexanoate, cumyl peroxy neodecanoate, hexyl peroxy pivalate, tert-butyl peroxy isobutylate, tert-butyl peroxy pivalate, tert-butyl peroxy acetate, tert-butyl peroxy benzoate and tert-butyl peroxy-2-ethylhexanate; a peroxydicarbonate such as diisopropyl peroxydicarbonate, di-2-ethylhexyl peroxydicarbonate, di-n-propyl peroxydicarbonate, bis(4-tert-butyl cyclohexyl)peroxydicarbonate, di-2-ethoxyethyl peroxydicarbonate, dimethoxyisopropyl peroxydicarbonate, di(3-methyl-3-methoxybutyl)peroxydicarbonate and diallyl peroxydicarbonate; a peroxycarbonate such as tert-butyl peroxyisopropylcarbonate; a peroxyketal such as di-tert-butyl peroxy cyclohexane and di-(tert-butyl peroxy)butane; a dialkyl peroxide such as dicumyl peroxide, tert-butyl cumyl peroxide and di-tert-butyl peroxide; a hydroperoxide such as cumene hydroperoxide and tetramethyl butyl hydroperoxide; a ketone peroxide such as ketone peroxide and cyclohexanone peroxide; and the like.

Examples of the azo compound include 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-aminopropane)nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, 2,2'-dimethyl azobisisobutyrate, 1,1'-azobis(1-methylbutyronitrile-3-sodium sulfonate), 2-(4-methylphenylazo)-2-methylmalonodinitrile, 4,4'-azobis-4-cyanovaleric acid, 3,5-dihydroxymethylphenylazo-2-allylmalonodinitrile, 2,2'-azobis-2-methylvaleronitrile, 4,4'-azobis-4-dimethyl cyanovalerate, 2,2'-azobis-2,4-dimethylvaleronitrile, 1,1'-azobiscyclohexanenitrile, 2,2'-azobis-2-propylbutyronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptane nitrile, 1,1'-azobis-1-phenylethane, 1,1'-azobiscumene, ethyl 4-nitrophenylazobenzyl cyanoacetate, phenylazodiphenylmethane, phenylazotriphenylmethane, 4-nitrophenylazotriphenylmethane, 1,1'-azobis-1,2-diphenylethane, poly(bisphenol A-4,4'-azobis-4-cyanopentanoate), poly (tetraethylene glycol-2,2'-azobisisobutyrate), and the like.

A content ratio of the contained polymerization initiator is preferably in a range from 1 to 20 parts by mass, more preferably from 1 to 15 parts by mass, and further preferably from 2 to 10 parts by mass based on 100 parts by mass of the content of the polymer (A) since radical species are generated by irradiation with radiation or by heating, to allow the reaction based on the polymerizable unsaturated bond to be accelerated and to allow the lowering of the tackiness to efficiently proceed.

In order to more easily peel off the adhesive layer from the product integrated with the adherend, the adhesive composition of the present invention preferably contains a polymerization initiator and other monomer in combination.

As the other monomer, a compound having two or more polymerizable unsaturated bonds (hereinafter, referred to as "polyfunctional monomer") can be used. When the other monomer contains the polyfunctional monomer in the present invention, an adhesive layer can be efficiently cured.

Examples of the polyfunctional monomer include a multifunctional (meth)acrylate, a polyfunctional (meth)acrylamide, an aromatic polyvinyl compound, a diallyl compound, a urethane acrylate, an epoxy acrylate, and the like.

Examples of the polyfunctional (meth)acrylate compound include polyethylene glycol di(meth)acrylate, diethylene glycol di(meth)acrylate, ethylene glycol di(meth)acrylate, propylene glycol di(meth)acrylate, 1,3-butylene glycol di(meth)acrylate, 1,4-butylene glycol di(meth)acrylate, 1,6-hexylene glycol di(meth)acrylate, neopentyl glycol di(meth)acrylate, polypropylene glycol di(meth)acrylate, dipropylene glycol di(meth)acrylate, 2-ethyl-2-butyl-propanediol (meth)acrylate, neopentyl glycol-modified trimethylolpropane di(meth)acrylate, stearic acid-modified pentaerythritol di(meth)acrylate, dicyclopentanyl di(meth)acrylate, 2,2'-bis(4-(meth)acryloxypropyloxyphenyl)propane, 2,2'-bis(4-(meth)acryloxydiethoxyphenyl)propane, trimethylolethane tri(meth)acrylate, trimethylolpropane tri(meth)acrylate, tetramethylolmethane tri(meth)acrylate, dimethylolpropane tetra(meth)acrylate, tetramethylolmethane tetra(meth)acrylate, diethyleneglycol di(meth)acrylate, triethyleneglycol di(meth)acrylate, pentaerythritol tri(meth)acrylate, pentaerythritol tetra(meth)acrylate, dipentaerythritol penta(meth)acrylate, dipentaerythritol hexa(meth)acrylate, oligoester(meth)acrylate, 2-(1,2-cyclohexacarboximide)ethyl (meth)acrylate, and the like.

Examples of the multifunctional (meth)acrylamide include N,N'-methylenebis(meth)acrylamide, N,N'-ethylenebis(meth)acrylamide, and the like.

Examples of the aromatic polyvinyl compound include divinylbenzene, 1,3,5-trivinylbenzene, and the like.

Examples of the diallyl compound include diallyl phthalate, diallyl fumarate, and the like.

In addition, allyl methacrylate, dicyclopentenyl (meth)acrylate, and the like can be used.

A content ratio of the other monomer is preferably in a range from 1 to 100 parts by mass, more preferably from 2 to 40 parts by mass, and further preferably from 5 to 30 parts by mass based on 100 parts by mass of the content of the polymer (A) since the adhesive layer can be easily peeled from the product integrated with the adherend by irradiation with radiation or by heating.

Examples of the additive include an antioxidant, an ultraviolet absorber, a plasticizer, a flame retardant, an antistatic agent, a colorant, a polymerization inhibitor, and a tackifier.

Examples of the organic solvent include a hydrocarbon, a ketone, an ester, an ether, an aromatic compound, and the like. When the adhesive composition of the present invention contains an organic solvent, the organic solvent is used such that a total content of the polymer (A), the polyisocyanate (B), the bismuth carboxylate (C) and the tertiary amine (D) is preferably in a range from 10% to 90% by mass, and more preferably from 15% to 50% by mass based on the whole of the composition from viewpoints of the coatability of the composition to a substrate and the like in the production of the adhesive film or the like, a gel time of the composition, and the like. When the adhesive composition of the present invention contains the organic solvent, the organic solvent is used such that the content of the polymer (A) is preferably in a range from 10% to 90% by mass, and more preferably from 15% to 50% by mass based on the whole of the composition.

Since the adhesive composition of the present invention contains the above polymer (A), polyisocyanate (B), bismuth carboxylate (C) and tertiary amine (D), a hydroxy group in the polymer (A) and an isocyanate group in the polyisocyanate (B) can be efficiently reacted with each other, so that an adhesive layer having an appropriate crosslinking density, and the like can be formed.

Furthermore, an adhesive composition of the present invention containing a polymerization initiator or the like in addition to the above polymer (A), polyisocyanate (B), bismuth carboxylate (C) and tertiary amine (D) doesn't lower the tackiness to the adherend. When a radiation is irradiated to an adhesive layer or the adhesive layer is heated, the adhesive layer composed of the reaction product of the polymer (A) and the polyisocyanate (B) is cured to lower the tackiness between the adhesive layer and the adherend. This allows the adhesive layer to be easily peeled off while suppressing the adhesive residues on the surface of the adherend. A method for lowering the tackiness by irradiation with radiation or heating can be appropriately selected depending on types and the like of the polymerization initiator contained in the adhesive layer. In the case of irradiation with radiation, ultraviolet light having a wavelength of from 200 to 450 nm is preferably used. In the case of heating, a heating temperature is preferably in a range from 100° C. to 200° C.

2. Production Method of Adhesive Composition

The adhesive composition of the present invention is obtained by mixing a polymer (hereinafter, also referred to as "raw material (P)") containing a structural unit having a hydroxy group in a side chain (hereinafter, also referred to as "structural unit (p1)"), a compound having two or more isocyanate groups (hereinafter, also referred to as "raw material (Q)"), a bismuth carboxylate (hereinafter, also referred to as "raw material (R)"), and a tertiary amine having a pKa of 6 or more (hereinafter, also referred to as "raw material (S)"). Incidentally, the raw material (P) corresponds to the polymer (A), and the raw materials (Q), (R) and (S) respectively correspond to the polyisocyanate (B), the bismuth carboxylate (C) and the tertiary amine (D). Preferable compounds are as described above.

In the production method of the present invention, a method for using each of the raw materials is not particularly limited, and the raw materials can be used singly. If necessary, a composition composed of a plurality of raw materials preliminarily prepared may be mixed with the remaining other raw materials. The raw materials may be mixed in the presence of an organic solvent.

In the present invention, the raw material (P) is a polymer containing a structural unit (p1) and may be a polymer containing the structural unit (a1) in the polymer (A). The raw material (P) may be a copolymer that further contains a structural unit having a urethane bond and a polymerizable unsaturated bond in a side chain (hereinafter, also referred to as "structural unit (p2)") as with the polymer (A).

A polymer (hereinafter, referred to as "polymer (P2)") containing a structural unit (p1) having a hydroxy group in a side chain and a structural unit (p2) having a urethane bond and a polymerizable unsaturated bond in a side chain can be obtained by reacting, for example, a polymer (P1) containing a structural unit (p1) having a hydroxy group in a side chain with a monomer (M) having an isocyanate group in the presence of a bismuth carboxylate while leaving a part of the structural unit (p1). In this reaction process (hereinafter, referred to as "first process"), a composition containing the polymer (P2) and the bismuth carboxylate used as the catalyst is obtained. After that, a process (hereinafter, referred to as "second process") of mixing the obtained composition, the raw material (Q) and the raw material (S) leads to an adhesive composition. The bismuth carboxylate used in the first process has not only an effect of accelerating the reaction in the first process but also an effect of accelerating the reaction between the polymer (P2) and the raw material (Q) in the adhesive composition obtained in the second process.

Hereinafter, this production method will be described as "production method (Z)".

The first process in the production method (Z) is a process in which the polymer (P1) containing the structural unit (p1) is reacted with the monomer (M) in the presence of the bismuth carboxylate to obtain a composition containing the polymer (P2) having the structural units (p1) and (p2) and the bismuth carboxylate.

The polymer (P1) used in the first process is a polymer containing the structural unit (p1), and may be either a homopolymer or a copolymer. The polymer (P1) may also be a copolymer further containing other structural unit (hereinafter, also referred to as "structural unit (p3)").

A content of the hydroxy group in the polymer (P1) is preferably in a range from 0.02 to 10 mmol, more preferably from 0.02 to 6 mmol, and further preferably from 0.02 to 3 mmol based on 1 g of the polymer (P1).

A content ratio of the structural unit (p1) in the polymer (P1) is preferably in a range from 1% to 40% by mass, more preferably from 1% to 20% by mass, and further preferably from 1% to 10% by mass based on 100% by mass of a total of all the structural units constituting the polymer (P1).

A number of the hydroxy groups contained in the structural unit (p1) constituting the polymer (P1) is not particularly limited.

Since the structural unit (p1) in the polymer (P1) corresponds to the structural unit (a1) constituting the polymer (A), the structural unit (a1-1) or (a1-2) constituting the polymer (A) can be applied. Monomers that impart these structural units are also as described above.

In particular, a structural unit derived from a (meth) acrylic acid hydroxy alkyl ester such as 2-hydroxyethyl (meth)acrylate, 4-hydroxybutyl(meth)acrylate, and 6-hydroxyhexyl(meth)acrylate is preferable.

The polymer (P1) can contain structural units other than the above as the structural unit (p1) as with the polymer (A). The polymer (P1) can contain a structural unit having a side chain branched from a main chain in which a side chain having a hydroxy group further has a carbonyl group or an ether bond; a structural unit having a side chain branched from a main chain and further containing an atom other than a carbon atom and a hydrogen atom; a structural unit having a side chain branched from a main chain and having a polyalkylene glycol skeleton; and the like.

When the polymer (P1) contains the other structural unit (p3), the structural unit (p3) is preferably a structural unit derived from (meth)acrylic acid alkyl ester such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth) acrylate, cyclohexyl (meth)acrylate, phenyl (meth)acrylate, and benzyl(meth)acrylate.

The monomer (M) used in the first process is a compound having an isocyanate group and a polymerizable unsaturated bond. Numbers of the isocyanate group and polymerizable unsaturated bond in the monomer (M) are not particularly limited. The monomer (M) is preferably a compound having an isocyanate group and a (meth)acryloyloxy group.

Examples of the monomer (M) include 2-(meth)acryloyloxyethyl isocyanate, (meth)acryloyl isocyanate, 1,1-bis (acryloyloxymethyl)ethyl isocyanate, 2-(0-[1'-methylpropylideneamino]carboxyamino)ethyl methacrylate, 2-[(3,5-dimethylpyrazolyl)carbonylamino]ethyl methacrylate, m-isopropenyl-α,α-dimethylbenzyl isocyanate, and the like. Among them, 2-(meth)acryloyloxyethyl isocyanate, 1,1-(bi-sacryloyloxymethyl)ethyl isocyanate, (2-(0-[1'-methylpropylideneamino]carboxyamino)ethyl methacrylate and 2-[(3, 5-dimethylpyrazolyl)carbonylamino]ethyl methacrylate are preferable, and 2-(meth)acryloyloxyethyl isocyanate is particularly preferable.

For example, commercially available products such as "Karenz MOI", "Karenz AOI", "Karenz BEI", and "Karenz MOI-EG" (trade names) manufactured by Showa Denko KK may be used as the monomer (M).

Amounts of the polymer (P1) and the monomer (M) to be used in the first process are set such that a molar ratio $(M_{NCO}/P_{OH})$ of an isocyanate group in the monomer (M) to a hydroxy group in the polymer (P1) is preferably in a range from 0.1 to 1, and more preferably from 0.4 to 1. Accordingly, when the polymer (P1) is reacted with the monomer (M) in the presence of the bismuth carboxylate, a part of the structural unit (p1) is modified to the structural unit (p2) while another part of the structural unit (p1) is left, and a polymer (P2) containing both the structural units (p1) and (p2) can be efficiently produced.

The first process is usually conducted in an organic solvent containing a hydrocarbon, a ketone, an ester, an ether, an aromatic compound, and the like. That is, the polymer (P1), the monomer (M), and the bismuth carboxylate that is a catalyst for forming a urethane bond are stirred while being bubbled with dry air in the organic solvent. A reaction temperature is preferably in a range from 65° C. to 90° C., and more preferably from 70° C. to 85° C. A reaction time is usually in a range from 4 to 36 hours, and preferably from 6 to 15 hours.

In the first process, it is preferable to add a polymerization inhibitor to the reaction system for the purpose of suppressing the reaction of the carbon-carbon unsaturated double bond in the monomer (M). As the polymerization inhibitor, hydroquinone, phenothiazine, and the like can be used.

The bismuth carboxylate is preferably $Bi(OOCR^{20})_3$ (in the formula, each of three $R^{20}$s is independently a hydrocarbon group having 1 to 17 carbon atoms). An amount of the bismuth carboxylate used in the first process is preferably in a range from 0.001 to 5 parts by mass, more preferably from 0.001 to 1 part by mass based on 100 parts by mass of the polymer (P1) from a viewpoint of urethane bond formability.

When the polymer (P1) and the monomer (M) are used in the preferable molar ratio in the first process, the obtained polymer (P2) contains a structural unit that is produced upon the reaction, namely, a structural unit represented by the general formula (4). When the polymer (P1) contains other structural units, the other structural units are also contained in the polymer (P2).

A reaction solution obtained in the first process usually contains the polymer (P2), the bismuth carboxylate and the organic solvent. The reaction solution can be used as it is, or a mixture obtained by removing the organic solvent (hereinafter, these are referred to as "first composition") can be used in the second process.

The second process in the production method (Z) is a process of mixing the composition (first composition) obtained in the first process, the raw material (Q), and the raw material (S). If necessary, the raw material (R), the above polymerization initiator that can be contained in the adhesive composition of the present invention, other monomers, additives, an organic solvent, and the like may be further used in combination.

An amount of the raw material (Q) to be used in the second process is appropriately selected depending on the intended cohesiveness and tackiness. The raw material (Q) may be used so that all of the hydroxy groups in the polymer (P2) are consumed by the contained isocyanate group, or may be used so that a part of the hydroxy groups remain. In general, an amount of the raw material (Q) used is preferably in a range from 1 to 40 parts by mass, more preferably from 1 to 20 parts by mass, and further preferably from 1 to 10 parts by mass based on 100 parts by mass of the polymer (P2).

An amount of the raw material (S) used is preferably in a range from 0.001 to 10 parts by mass, more preferably from 0.01 to 5 parts by mass, and further preferably from 0.1 to 3 parts by mass based on 100 parts by mass of the polymer (P2).

A mixing method in the second process is not particularly limited.

3. Adhesive Film

The adhesive film of the present invention is characterized in that the adhesive film includes a substrate and an adhesive layer disposed on a surface of the substrate and that the adhesive layer includes the adhesive composition of the present invention.

A constituent material of the substrate is not particularly limited, and may contain an optional resin (composition). The constituent material can be appropriately selected depending on an application of the adhesive film or a composition of the adhesive layer, and may have heat resistance, water resistance, organic solvent resistance, or the like. When the adhesive layer containing the polymerization initiator and the like is cured by causing the polymerization initiator to act on the adhesive layer upon irradiation with radiation or heating, to decrease adhesive strength with the adherend, it is necessary to use a material having excellent radiation permeability or a material having excellent heat resistance.

Examples of the constituent material for the substrate include a polymer containing a structural unit derived from an α-olefin such as polyethylene, polypropylene, an ethylene propylene copolymer, polybutene-1, poly 4-methylpentene-1, an ethylene vinyl acetate copolymer, an ethylene ethyl acrylate copolymer, an ethylene methyl acrylate copolymer, an ethylene acrylic acid copolymer, and an ionomer; a polyester resin such as polyethylene terephthalate and polyethylene naphthalate; an acrylic resin; a styrene-based resin; a polyamide resin; a polyurethane resin; a polyvinyl chloride resin; a polyvinylidene chloride resin; a polyimide resin; a polyvinyl alcohol resin; a cellulose resin; and the like from a viewpoint of the flexibility of the adhesive film. A film obtained by subjecting the substrate film composed of the resin to electron beam crosslinking can also be used. These resins may be contained alone or in combination of two or more types. The types of the resin can be appropriately selected depending on the application of the adhesive film.

The substrate may be either a single layer type or a lamination type. In a case of the lamination type, any combination of resins can be used, but a laminated body including a polyolefin resin layer and a polyester resin layer, a laminated body including a plurality of polyolefin resin layers, and the like can be used.

To a surface of the substrate on which the adhesive layer is formed, a radiation treatment, a corona discharge treatment, coating of a surface treatment agent, and the like may be applied. A smoothness of the surface on which the adhesive layer is formed is not particularly limited, and may have a convex portion, a concave portion, or the like.

A thickness of the substrate is not particularly limited, but is preferably in a range from 5 to 800 μm, and more preferably from 10 to 600 μm.

The adhesive layer is a layer containing the adhesive composition of the present invention, and may be a layer that contains a mixture containing a polymer (A), polyisocyanate (B), a bismuth carboxylate (C) and a tertiary amine (D) and hardly containing an organic solvent, or contains an adhesive component consisting of a reaction product of the polymer (A) and the polyisocyanate (B), the bismuth carboxylate (C) and the tertiary amine (D).

When the adhesive composition of the present invention contains an organic solvent, the adhesive layer may contain 2% by mass or less of the organic solvent based on the whole of the adhesive layer.

A thickness of the adhesive layer is preferably in a range from 1 to 100 am, and more preferably from 5 to 50 μm since a tackiness of the adhesive layer with respect to the adherend can be surely obtained.

Since the definition of the adhesive film in the present specification is as described above, the adhesive film of the present invention may be an adhesive film 10 (single-sided adhesive film, see FIG. 1) having an adhesive layer 13 on one surface of a substrate 11, and an adhesive film (two-sided adhesive film, not shown) having an adhesive layer 13 on each of both surfaces of the substrate 11. These aspects are referred to as "adhesive film of the first aspect".

Figure 2:
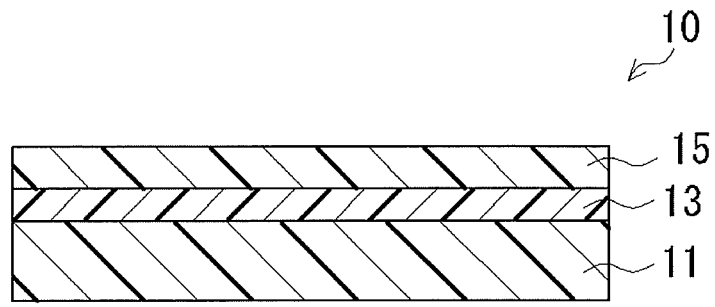
FIG. 2 is a schematic cross-sectional view showing an example of an adhesive film of a second embodiment in the present invention.

In order to protect the adhesive layer 13, the adhesive film of the present invention may be an adhesive film 10 (see FIG. 2) including a release film (release paper) 15 on the surface of the adhesive layer 13 in the adhesive film of the first aspect or an adhesive film (not shown) including a release film (release paper) 15 on each of both the surfaces of the adhesive layer 13. These aspects are referred to as "adhesive film of the second aspect".

In the present invention, the adhesive film of the first aspect can be produced by coating a film for a substrate with the adhesive composition of the present invention, and further drying a coated film, if necessary. As the coating method, a conventionally known roll coating method, reverse roll coating method, gravure roll coating method, bar coating method, comma coating method, die coating method, and the like for coating with an adhesive composition, an adhesive composition, a coating material, or the like can be applied. The adhesive composition may be a composition containing an organic solvent or a composition not containing an organic solvent. In the former case, the coated film is usually dried under conditions that do not cause the deformation of the film for a substrate, the volatilization of the tertiary amine (D) contained in the adhesive composition, and the like, to obtain an adhesive layer.

When the adhesive film of the first aspect is a single-sided adhesive film, and is in the form of a roll, a surface of the substrate 11 on which the adhesive layer 13 is not formed and a surface of the adhesive layer 13 come into contact with each other, so that a surface of the substrate 11 on which the adhesive layer 13 is not formed preferably has a release function in order that the adhesive layer 13 can be peeled off. The same release function as that in the release film described later can be provided.

In the present invention, the adhesive film of the second aspect can be produced by coating the film for a substrate with the adhesive composition of the present invention to form an adhesive layer, and thereafter pasting a release film on the adhesive layer. The release film may be pasted while being pressurized, and the whole of the film may also be pressurized after being pasted.

The release film may be either a single layer type or a lamination type as long as the release film has lower adhesiveness with respect to the adhesive composition on a surface of the release film facing the adhesive layer, that is, the surface having a release function than that with respect to a surface of the substrate 11. The release film may be a film consisting of a resin (composition) having a release function with respect to the adhesive composition, or a film having a release function provided by subjecting a film regardless of the possibility of a release function to coating, a surface treatment, or the like. In the latter case, a release film consisting of a polyester resin film to which a release function is imparted using silicone has solvent resistance and heat resistance, so that defects can be avoided even when the adhesive composition is directly applied on a silicone-treated surface and dried upon the production of the adhesive film.

A thickness of the release film is usually in a range from 10 to 100 µm from viewpoints of a flexibility of the adhesive film, a releasability of the release film, and the like.

In a case where the adhesive film of the second aspect is produced by other method, a production method may be applied in which the adhesive composition of the present invention is coated on a release film to form an adhesive layer, and then a film for a substrate is pasted on the adhesive layer. Also in this case, the substrate film may be pasted while pressure is applied, and the whole of the film may also be pressurized after the substrate film is pasted.

As described above, as an aspect not shown in the drawings, a product form in which the adhesive layer 13 is sandwiched between the two release films 15 may be provided by pasting the release surface of another release film in place of the substrate film. In this case, after one of the two release films is peeled off, and an adhesive film is attached to an adherend, the release film remaining on the adhesive layer of the substrate is removed, so that only the adhesive layer formed using the adhesive composition may be formed on the adherend. Since the release film located on one side is peeled off without damaging the adhesive layer in the case of such a product form, a difference in peel strength between the first release film and the second release film with respect to the adhesive layer is preferably provided.

The adhesive film of the present invention may include an intermediate layer (not shown) between the substrate 11 and the adhesive layer 13. The intermediate layer can be provided for purposes of absorbing impact, preventing warpage, imparting irregular absorbency, preventing the invasion of water, organic solvent, chemical liquid and foreign matters, and the like. The intermediate layer is preferably a resin layer, and an optional resin can be used as the resin contained in the intermediate layer as long as it adheres to the substrate 11 and the adhesive layer 13. Examples thereof include an acrylic resin, a polyolefin, a polyester, a polyether, a polyurethane, and the like. These resins may be contained singly or in combination of two or more types thereof. When an optional adhesive layer is provided between the substrate 11 and the intermediate layer or between the intermediate layer and the adhesive layer 13, or a surface of the intermediate layer is subjected to an easy adhesion treatment such as a corona treatment and a plasma treatment, the adhesiveness of each layer can also be improved. The intermediate layer can be formed on the substrate 11 in the same manner as the formation of the adhesive layer 13. The intermediate layer may be formed on the adhesive layer 13 by coating and the like.

A thickness of the intermediate layer can be optionally set according to types and application of the adherend used. The thickness of the intermediate layer is preferably in a range from 10 to 700 µm from viewpoints of flexibility and adhesiveness.

The adhesive film of the present invention is suitable for processing semiconductor parts such as a semiconductor wafer and electronic parts. Hereinafter, a grinding method of a back face of a semiconductor wafer on which a polyimide film having a low dielectric constant and excellent heat resistance and chemical resistance, or an integrated circuit is formed will be described.

A surface of the adhesive layer of the adhesive film is exposed, and then stuck on a surface (front surface) on which the polyimide film or the integrated circuit is formed. The sticking can be manually conducted, but, for example, it can also be conducted by an automatic sticking machine and the like to which a roll-like adhesive film is attached.

Subsequently, the semiconductor wafer is fixed to a chuck table of a grinding machine, and the like via the substrate of the adhesive film, and the back face of the semiconductor wafer is ground. The grinding method may be a through-feed process, an in-feed process, and the like. These methods are conducted while water is applied to the semiconductor wafer and a grinding stone to cool them. Chemical etching can be conducted after the back face is ground.

Thereafter, the adhesive film is peeled off from the semiconductor wafer. The peeling can be conducted manually or by a device such as an automatic peeling machine. The adhesive layer may be cured by irradiating the adhesive film with radiation or heating the semiconductor wafer, thereby to lower the adhesiveness, followed by peeling off the adhesive film. On an exposed surface of the semiconductor wafer, adhesive residues derived from the adhesive layer of the adhesive film are suppressed.

The semiconductor wafer after the back face is ground is fixed on a dicing tape and is divided into chips. Examples of the process for fixing the semiconductor wafer on the dicing tape include a process for pasting and fixing a ring frame and the adhesive surface of the dicing tape on the back face (ground surface) of a semiconductor wafer on which an adhesive film for protecting a circuit surface is pasted, and a process for peeling off an adhesive film for protecting a circuit surface, and thereafter pasting and fixing a ring frame and the adhesive surface of the dancing tape. Next, the semiconductor wafer fixed on the dicing tape is divided into chips by a cutting process using a blade or a cutting process using a laser. The divided semiconductor chips are picked up from the dicing tape, but the adhesive layer of the dicing tape is preferably irradiated with radiation from the substrate surface of the dicing tape after being divided into chips, to cure the adhesive layer of the dicing tape, thereby to lower the tackiness, followed by picking up the divided semiconductor chips. According to the process, residues derived from the adhesive layer of the dicing tape can be suppressed on the back face of the semiconductor chip; stress applied to the semiconductor chips at picking up can be suppressed; and the breakage and crack of the semiconductor chips at picking up can be suppressed.

EXAMPLES

Hereinafter, the present invention is described in detail using examples.

Example 1

80 parts by mass of n-butyl acrylate, 13 parts by mass of methyl methacrylate, 7 parts by mass of 2-hydroxyethyl acrylate, and 0.25 parts by mass of tert-butylperoxy-2-ethylhexanoate "PERBUTYL O" (trade name, polymerization initiator) manufactured by NOF Corporation were supplied into a mixed solvent composed of toluene and ethyl acetate, and a polymerization reaction was conducted in a nitrogen stream at a temperature of 80° C. to 85° C. for 11 hours to obtain a polymer (k1) having a hydroxy group. A weight average molecular weight of the polymer (k1) in terms of polystyrene by GPC was 320,000.

Subsequently, 7 parts by mass of 2-methacryloyloxyethyl isocyanate, 0.05 part by mass of 2-ethylhexanoate bismuth, 0.05 parts by mass of bismuth 2-ethylhexanoate (catalyst), and 0.05 part by mass of phenothiazine (polymerization inhibitor) based on 100 parts by mass of the polymer (p1) were added to the reaction solution of the polymer (k1) for a urethanization reaction at a temperature of 75° C.±5° C. for 12 hours to obtain a polymer (X1). Then, an amount of 2-methacryloyloxyethyl isocyanate remaining in the reaction solution was analyzed by gas chromatography to be 22% by mass. It was found that the polymer (X1) is a polymer containing a structural unit having a urethane bond and a polymerizable unsaturated bond in a side chain, and a structural unit having a hydroxy group in a side chain. A weight average molecular weight of the polymer (X1) in terms of polystyrene by GPC was 325,000.

Thereafter, 12 parts by mass of dipentaerythritol hexaacrylate "ARONIX M400" (trade name) manufactured by Toagosei Co., Ltd., 7 parts by mass of 2,2-dimethoxy-1,2-diphenylethan-1-one "IRGACURE 651" (trade name) manufactured by BASF Japan Ltd., 1 part by mass of polyisocyanate "ORESTER P49-75S" (trade name, adduct composed of trimethylolpropane and tolylene diisocyanate) manufactured by Mitsui Chemicals, Inc., and 0.3 part by mass of 1-benzyl-2-methylimidazole (pKa: 14.5, boiling point: 175° C., catalyst) based on 100 parts by mass of the polymer (X1) were mixed with the reaction solution of the polymer (X1), to obtain an adhesive composition (S1).

A constitution of the adhesive composition (S1) is shown in Table 1.

Next, the adhesive composition (S1) was applied to a surface of a processed film "Purex A31" (trade name, thickness: 38 μm) manufactured by Teijin Dupont Film Japan Limited as a release film, followed by drying at a temperature of 130° C., to form an adhesive layer having a thickness of 40 μm. Then, an ethylene-vinyl acetate copolymer film (thickness: 10 μm) having a vinyl acetate unit amount of 10% by mass was pasted on the adhesive layer, to obtain an adhesive film.

The resultant adhesive film was evaluated by the following methods. The results are shown in Table 1.

(1) Tackiness

An adhesive film (width: 25 mm) having an adhesive layer as a lower surface was placed on a flat plate made of SUS 304, attached using a pressure roller having a mass of 2 kg, and left to stand for 1 hour. After that, the adhesive film was peeled off at a tensile rate of 300 mm/min in accordance with JIS Z0237 using an autograph "AGS-G" (model name) manufactured by Shimadzu Corporation, to measure peel strength. The unit is N/25 mm.

(2) Adhesive Residues after Peeling

An adhesive film having an adhesive layer as a lower surface was attached to a silicon wafer having a polyimide film formed on its surface, attached using a pressure roller having a mass of 2 kg, and left to stand for 1 hour. After that, a surface of the substrate of the adhesive film in the integrated product was irradiated with ultraviolet light having an illuminance of 100 mW/cm$^2$ using a high-pressure mercury lamp so that an irradiation amount of the ultraviolet light was 1,000 mJ/cm$^2$. Subsequently, the adhesive film was peeled off from the silicon wafer. Adhesive residues on the surface of the polyimide film were observed visually or with an optical microscope, and determined according to the following criteria.

"3": Adhesive residues (long adhesive residues: 5 μm or more)

"2": Slight adhesive residues (long adhesive residues: less than 5 μm)

"1": No adhesive residues

Example 2

An adhesive composition (S2) and an adhesive film were produced and evaluated in the same manner as those in Example 1 except that 1,2-dimethylimidazole (pKa: 14.5, boiling point: 204° C.) was used in place of 1-benzyl-2-methylimidazole. The results are shown in Table 1.

Example 3

An adhesive composition (S3) and an adhesive film were produced and evaluated in the same manner as those in Example 1 except that bifonazole (pKa: 14.5, melting point: 149° C.) was used in place of 1-benzyl-2-methylimidazole. The results are shown in Table 1.

Example 4

An adhesive composition (S4) and an adhesive film were produced and evaluated in the same manner as those in Example 1 except that triethylenediamine (pKa: 8.8, boiling point: 174° C.) was used in place of 1-benzyl-2-methylimidazole. The results are shown in Table 1.

Example 5

An adhesive composition (S5) and an adhesive film were produced and evaluated in the same manner as those in Example 1 except that dimethylbenzylamine (pKa: 8.9, boiling point: 184° C.) was used in place of 1-benzyl-2-methylimidazole. The results are shown in Table 1.

Comparative Example 1

An adhesive composition (S6) and an adhesive film were produced and evaluated in the same manner as those in Example 1 except that 1-benzyl-2-methylimidazole was not used. The results are shown in Table 1.

Comparative Example 2

An adhesive composition (S7) and an adhesive film were produced and evaluated in the same manner as those in Example 1 except that dimethylcyclohexylamine (pKa: 4.9, boiling point: 160° C.) was used in place of 1-benzyl-2-methylimidazole. The results are shown in Table 1.

Comparative Example 3

An adhesive composition (S8) and an adhesive film were produced and evaluated in the same manner as those in Example 1 except that zirconium neodecanoate was used in place of bismuth 2-ethylhexanoate. The results are shown in Table 1.

TABLE 1

| | | | (A) Type Polymer | (B) Polyisocyanate (ORESTER P49-75S) | (C) Bismuth carboxylate | (D) Tertiary amine | Polyfunctional monomer (ARONIX M400) | Photo polymerization initiator (IRGACURE 651) | Peel strength (N/25 mm) | Adhesive residues |
|---|---|---|---|---|---|---|---|---|---|---|
| Examples | 1 | S1 | (X1) 100 | 1 | 2-Ethylhexane bismuth 0.05 | 1-Benzyl-2-methylimidazole 0.3 | 12 | 7 | 5.4 | 1 |
| | 2 | S2 | (X1) 100 | 1 | 2-Ethylhexane bismuth 0.05 | 1,2-methylimidazole 0.3 | 12 | 7 | 6.0 | 1 |
| | 3 | S3 | (X1) 100 | 1 | 2-Ethylhexane bismuth 0.05 | Bifonazole 0.3 | 12 | 7 | 5.1 | 1 |
| | 4 | S4 | (X1) 100 | 1 | 2-Ethylhexane bismuth 0.05 | Triethylenediamine 0.3 | 12 | 7 | 6.5 | 2 |
| | 5 | S5 | (X1) 100 | 1 | 2-Ethylhexane bismuth 0.05 | Dimethylbenzylamine 0.3 | 12 | 7 | 6.8 | 2 |
| Comparative Examples | 1 | S6 | (X1) 100 | 1 | 2-Ethylhexane bismuth 0.05 | — | 12 | 7 | 9.0 | 3 |
| | 2 | S7 | (X1) 100 | 1 | 2-Ethylhexane bismuth 0.05 | Dimethylcyclohexylamine 0.3 | 12 | 7 | 9.2 | 3 |
| | 3 | S8 | (X1) 100 | 1 | Zirconium neodecanoate 0.05 | 1-Benzyl-2-methylimidazole 0.3 | 12 | 7 | 5.6 | 3 |

As is apparent from Table 1, adhesive acceleration with respect to an adherend was observed, and adhesive residues were remarkable in Comparative Examples 1 and 2. In Comparative Example 3, adhesive acceleration was suppressed, but the addition reaction of the polymerizable unsaturated bond was insufficient, which caused adhesive residues. On the contrary, in Examples 1 to 5 as the embodiments of the present invention, adhesive acceleration was suppressed and appropriate tackiness was obtained. Adhesive residues upon peeling off after irradiation with ultraviolet light were suppressed. Since an adhesive composition of the present invention contains a bismuth carboxylate (C) and a tertiary amine (D), it is thought that the tertiary amine (D) particularly suitably acts to suppress adhesive acceleration when a polymer containing a hydroxy group is reacted with a compound having two or more isocyanate groups to form a cross-linked structure due to a urethane bond between the polymers; when a polymer having a hydroxy group is reacted with a compound having a polymerizable unsaturated bond and an isocyanate group to add the polymerizable unsaturated bond to the polymer, the bismuth carboxylate (C) suitably acts to appropriately impart a polymer (A) having the polymerizable unsaturated bond added thereto; and a reaction product of the polymer (A) and the polyisocyanate (B) is cured while aggregating via the crosslinking reaction of the polymerizable unsaturated bond added to the polymer (A) upon ultraviolet light irradiation, and the adhesive residues on the surface of the adherend (polyimide resin film) are suppressed.

INDUSTRIAL APPLICABILITY

The adhesive composition of the present invention does not contain an organotin compound having an adverse influence on the human body and the environment as a catalyst, and can provide not only smooth adhesion to an adherend but also smooth integration of a plurality of articles and smooth peeling between the adherend and an adhesive layer. When a polymerization initiator is contained in the adhesive composition, smooth peeling between the adhesive layer and the adherend can be provided in particular. When the polymerization initiator generates radical species upon irradiation with radiation, the radiation used suitably has a spectral distribution between an ultraviolet region and a near infrared region. As the radiation source, a halogen lamp, a mercury lamp, a high-pressure mercury lamp, an extra-high-pressure mercury lamp, a xenon lamp, a carbon arc, a metal halide lamp, a gallium lamp, an excimer laser, a semiconductor laser, a fluorescent lamp, and the like are suitable. The constituent material of the adherend may be either an inorganic material or an organic material, or a combination thereof.

The adhesive composition of the present invention is particularly suitably used for an adhesive layer of an adhesive film for protecting a circuit surface upon back face grinding or an adhesive layer of a dicing tape used in production processes for semiconductor parts, electronic parts, and the like.

REFERENCE SIGNS LIST

10: adhesive film, 11: substrate, 13: adhesive layer, 15: release film

The invention claimed is:
1. An adhesive composition comprising (A) a polymer comprising a structural unit having a hydroxy group in a side chain, and a structural unit having a urethane bond and a polymerizable unsaturated bond in a side chain, (B) a compound having two or more isocyanate groups, (C) a bismuth carboxylate, and (D) a tertiary amine having a pKa of 6 or more,
  wherein a content of the bismuth carboxylate (C) is in a range from 0.001 to 5 parts by mass based on 100 parts by mass of the polymer (A),
  wherein a content of the tertiary amine (D) is in a range from 0.001 to 5 parts by mass based on 100 parts by mass of the polymer (A),
  wherein the structural unit having a hydroxy group is at least one unit among units represented by following formulae (1) and (2),

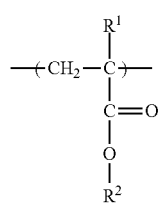

wherein $R^1$ is a hydrogen atom or a methyl group, and $R^2$ is an organic group containing a hydroxy group,

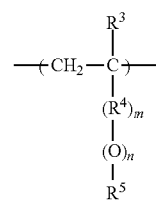

wherein $R^3$ is a hydrogen atom or a methyl group; $R^4$ is a divalent hydrocarbon group having 1 to 24 carbon atoms; $R^5$ is a hydroxy group containing hydrocarbon group having 1 to 24 carbon atoms in which at least one hydrogen atom is substituted with a hydroxy group, or a hydrogen atom; and m and n are independently 0 or 1, when m is 0, n is 0 or 1, and $R^5$ is a hydroxy group containing hydrocarbon group having 1 to 24 carbon atoms in which at least one hydrogen atom is substituted with a hydroxy group, and when m is 1, n is 0 or 1, and $R^5$ is a hydroxy group containing hydrocarbon group having 1 to 24 carbon atoms in which at least one hydrogen atom is substituted with a hydroxy group, or a hydrogen atom.

2. The adhesive composition according to claim 1, wherein
  the bismuth carboxylate (C) is represented by Bi(OOCR$^{20}$)$_3$:
  wherein each of three $R^{20}$s is independently a hydrocarbon group having 1 to 17 carbon atoms.

3. The adhesive composition according to claim 1, further comprising a polymerization initiator.

4. A production method of the adhesive composition according to claim 1 comprising sequentially a first process in which a composition comprising a polymer (P2) and the bismuth carboxylate, the polymer (P2) obtained by reacting a polymer (P1) comprising a structural unit (p1) having a hydroxy group in a side chain with a monomer (M) having an isocyanate group in the presence of the bismuth carboxylate to modify a part of the structural unit (p1) to a structural unit (p2) that has a urethane bond and a polymerizable unsaturated bond in a side chain while leaving another part of the structural unit (p1), and comprising the structural unit (p1) and the structural unit (p2), and a second process in which the composition, a compound having two or more isocyanate groups, and a tertiary amine having a pKa of 6 or more are mixed,
  wherein the bismuth carboxylate is used in an amount from 0.001 to 5 parts by mass based on 100 parts by mass of the polymer (P1) in the first process,
  wherein the tertiary amine is used in an amount from 0.5 to 80 parts by mass based on 1 part by mass of the bismuth carboxylate,
  wherein the structural unit (p1) is at least one unit among units represented by following formulae (1) and (2),

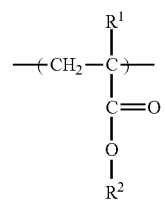

wherein $R^1$ is a hydrogen atom or a methyl group, and $R^2$ is an organic group containing a hydroxy group,

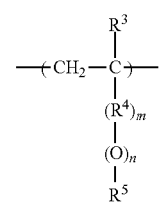

wherein $R^3$ is a hydrogen atom or a methyl group; $R^4$ is a divalent hydrocarbon group having 1 to 24 carbon atoms; $R^5$ is a hydroxy group containing hydrocarbon group having 1 to 24 carbon atoms in which at least one hydrogen atom is substituted with a hydroxy group, or a hydrogen atom; and m and n are independently 0 or 1, when m is 0, n is 0 or 1, and $R^5$ is a hydroxy group containing hydrocarbon group having 1 to 24 carbon atoms in which at least one hydrogen atom is substituted with a hydroxy group, and when m is 1, n is 0 or 1, and $R^5$ is a hydroxy group containing hydrocarbon group having 1 to 24 carbon atoms in which at least one hydrogen atom is substituted with a hydroxy group, or a hydrogen atom.

5. The production method according to claim 4, wherein the monomer (M) having an isocyanate group is a compound having a (meth)acryloyloxy group.

6. The production method according to claim 4, wherein the bismuth carboxylate (C) is represented by Bi(OOCR$^{20}$)$_3$:
  wherein each of three $R^{20}$s is independently a hydrocarbon group having 1 to 17 carbon atoms.

7. An adhesive film comprising a substrate and an adhesive layer disposed on a surface of the substrate, the adhesive layer comprising the adhesive composition according to claim 1.

8. The adhesive film according to claim 7, comprising sequentially the substrate, the adhesive layer, and a release film.

* * * * *